A. Moore,
Boring Hubs,
Nº 16,932. Patented Mar. 31, 1857.
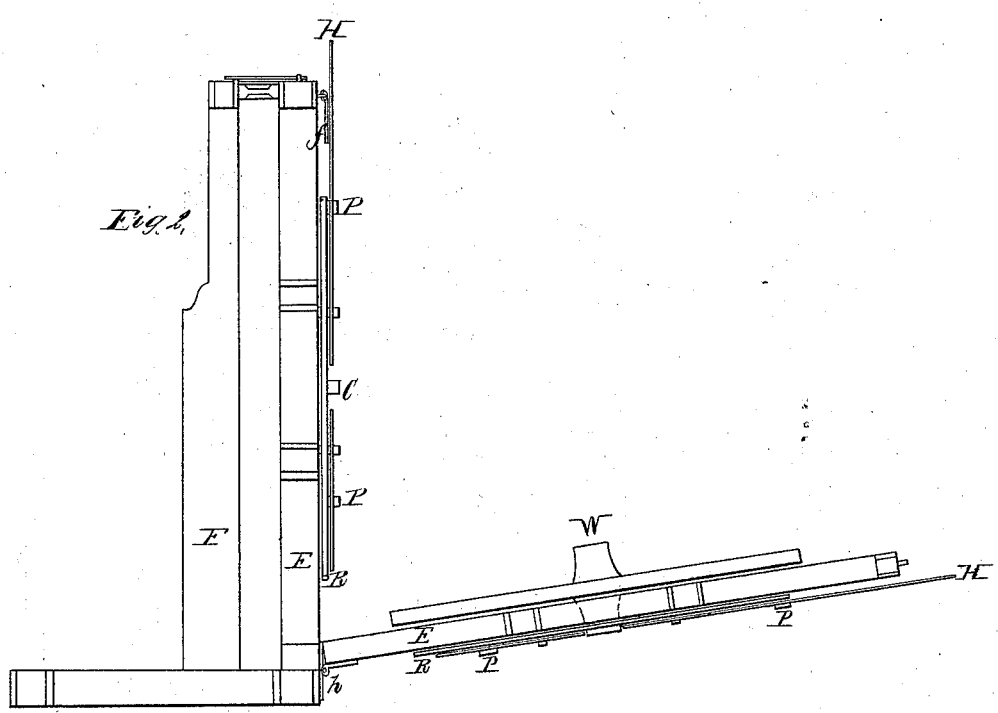
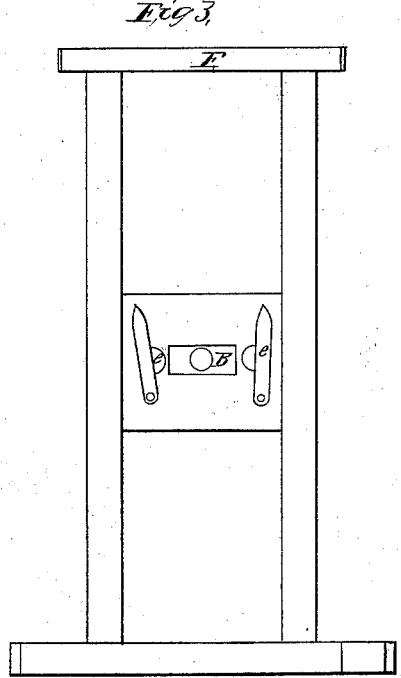
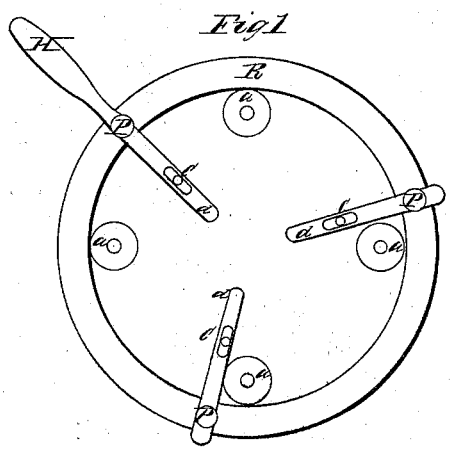

UNITED STATES PATENT OFFICE.

ALBERT MOORE, OF HONEOYE FALLS, NEW YORK.

METHOD OF CENTERING AND HOLDING HUBS WHILE BEING BORED.

Specification of Letters Patent No. 16,932, dated March 31, 1857.

*To all whom it may concern:*

Be it known that I, ALBERT MOORE, of Honeoye Falls, in the county of Monroe and State of New York, have made and invented certain new and useful Improvements in Machines for Centering and Boring Circular Disks and Similar Forms, said improved machines being peculiarly adapted to the boring of wagon-wheel hubs for the purpose of setting the boxes.

The first object of my invention is to provide a mode of accurately and expeditiously centering the object to be bored. This I do by means of the chuck which is shown separate in Figure 1. In this chuck the ring (R) revolves around its center being guided by the four friction wheels ($a, a, a, a$). Attached to this ring by the pivots ($p, p, p,$) are the three arms $d, d, d$, which slide on the three pins $c, c, c$. These pins are stationary being firmly attached to the frame upon which the clutch is placed, and hence the ring (R) revolving will alter the direction of the arms $d, d, d$ in relation to the center of the chuck and will also vary the distance of their points therefrom as will be readily seen on inspecting the drawing and models. Hence by moving the handle H attached to one of these arms in the required direction any object may be grasped or released by the chuck. The remainder of the machine will be best understood by reference to Fig. 2 where it will be seen that the chuck R holds the wheel W centrally by the hub.

To place the wheel in this position the frame (E) is laid down flat which may be done by means of the hinge ($h$). This frame is supported by feet ($f$). The wheel being placed upon it is fixed in the chuck by moving the handle H and then the frame E being brought into a vertical position the hub is ready for the action of the borer.

Fig. 3 shows the means of securing the nut which serves to feed the boring bar. As now shown the nut may be easily placed in the oblong cavity B but when the plates ($e, e$) are moved across this cavity (which may easily be done—they sliding on pivots at the lower ends) it is evident that said nut will be securely held in place. The boring bar is guided by this nut and by the bar (G) which passes across in front of the machine.

Having thus described my invention what I claim therein as new and desire to secure by Letters Patent is—

1. The construction of the chuck Fig. 1 consisting of the conbination of the ring R, and arms ($d, d, d$) said arms moving as described upon the fixed and movable points ($p, p, p$) and ($c, c, c$).

2. I claim the arrangement of the frames E and F in the manner and for the purpose substantially as described.

ALBERT MOORE.

Witnesses:
JOHN RHIN,
A. H. AMIDEN.